US012564749B2

(12) United States Patent  
Kim et al.

(10) Patent No.: US 12,564,749 B2  
(45) Date of Patent: Mar. 3, 2026

(54) LONG-TERM RETARDANT AND FIRE-SUPPRESSING GEL COMPOSITIONS

(71) Applicant: PERIMETER SOLUTIONS LP, St. Louis, MO (US)

(72) Inventors: Melissa R. Kim, Ontario, MO (US); Howard L. Vandersall, Upland, CA (US); Urvashi Khosla, St. Louis, MO (US); Juan Robles, Highland, CA (US)

(73) Assignee: PERIMETER SOLUTIONS LP, Saint Louis, MO (US)

( * ) Notice: Subject to any disclaimer, the term of this patent is extended or adjusted under 35 U.S.C. 154(b) by 909 days.

(21) Appl. No.: 16/982,855

(22) PCT Filed: Mar. 22, 2019

(86) PCT No.: PCT/US2019/023533
§ 371 (c)(1),
(2) Date: Sep. 21, 2020

(87) PCT Pub. No.: WO2019/183451

PCT Pub. Date: Sep. 26, 2019

(65) Prior Publication Data

US 2021/0052928 A1 Feb. 25, 2021

Related U.S. Application Data

(60) Provisional application No. 62/646,680, filed on Mar. 22, 2018.

(51) Int. Cl.
| | |
|---|---|
| *C01B 25/28* | (2006.01) |
| *A62D 1/00* | (2006.01) |
| *C01B 33/40* | (2006.01) |

(52) U.S. Cl.
CPC ......... *A62D 1/0014* (2013.01); *A62D 1/0064* (2013.01); *C01B 25/28* (2013.01); *C01B 33/40* (2013.01)

(58) Field of Classification Search
None
See application file for complete search history.

(56) References Cited

U.S. PATENT DOCUMENTS

| | | | |
|---|---|---|---|
| 3,976,580 A | 8/1976 | Kaminstein et al. | |
| 4,346,012 A * | 8/1982 | Umaba ................. A62D 1/0014 | |
| | | | 523/207 |
| 4,978,460 A * | 12/1990 | Von Blucher .......... A62D 1/005 | |
| | | | 252/2 |
| 9,616,263 B2 * | 4/2017 | Hagquist .............. A62D 1/0064 | |
| 2007/0289752 A1 | 12/2007 | Beck et al. | |
| 2013/0180738 A1 | 7/2013 | Kim et al. | |
| 2013/0264509 A1 * | 10/2013 | Shalev ................... A62D 1/005 | |
| | | | 252/2 |
| 2014/0323619 A1 * | 10/2014 | Palaikis ................. A62D 1/005 | |
| | | | 524/52 |
| 2016/0030789 A1 * | 2/2016 | Cordani ............... A62D 1/0064 | |
| | | | 252/2 |
| 2021/0130696 A1 * | 5/2021 | Issartel .................. C09K 21/10 | |

FOREIGN PATENT DOCUMENTS

| | | | | |
|---|---|---|---|---|
| DE | 4336319 A1 * | 4/1995 | .......... A62D 1/0014 | |
| WO | WO-0154773 A2 * | 8/2001 | ............. A62D 1/005 | |
| WO | WO-2016003440 A1 * | 1/2016 | .......... A62D 1/0064 | |
| WO | WO-2018134393 A1 * | 7/2018 | ............. C09K 21/04 | |

OTHER PUBLICATIONS

International Search Report, PCT/US2019/023533, dated Jun. 7, 2019, 3 pages.
Written Opinion, PCT/US2019/023533, dated Jun. 7, 2019, 5 pages.

* cited by examiner

*Primary Examiner* — Tanisha Diggs
(74) *Attorney, Agent, or Firm* — Harness, Dickey & Pierce, P.L.C.

(57) ABSTRACT

Disclosed herein are compositions comprising a super absorbent polymer (SAP) concentrate mixed with a long-term fire-retardant concentrate, prior to dilution with water, to form a mixed concentrate and methods of making such compositions. The mixed concentrate composition can be subsequently mixed with water to produce an aqueous fire-fighting solution.

12 Claims, No Drawings

LONG-TERM RETARDANT AND FIRE-SUPPRESSING GEL COMPOSITIONS

BACKGROUND

Fire suppressant gels rely on their contained water to suppress flaming combustion via direct attack on burning fuel. Long-term fire retardants, on the other hand, contain components that retard fire and reduce flammability after all of their contained water has drained or evaporated from their solutions and are most effective when applied on the fuel ahead of an oncoming fire.

Super Absorbent Polymers (SAP) are capable of absorbing extremely large amounts of water resulting in solutions with viscosities significantly greater than water. However, these polyacrylate or polyacrylamide type gels are especially sensitive to the presence of foreign ions in the water which they absorb. For example, a 0.7% solution of a SAP concentrate will often produce a solution with a viscosity of several thousand centipoises (cP) when the water in which they are diluted is relatively "soft", i.e., ≤50 ppm of hardness ions. If the water is relatively hard (>222 ppm), however, the viscosity of this same solution can be as low as 10 cP.

Long-term fire-retardant solutions are prepared by mixing a retardant concentrate with water to form a solution containing ≥10% of highly ionic retardant salts, and optionally corrosion inhibitors and other functional chemicals. Consequently, since liquid gels are well known to be sensitive to even small quantities of ionic residues, great effort is exerted to segregate the two fire-fighting chemicals.

SUMMARY

The present disclosure is drawn to compositions for producing an aqueous fire-fighting solution (e.g., fire-fighting concentrates). In certain aspects, the composition comprises a homogeneous mixture of a super absorbent polymer (SAP) concentrate and a long-term fire-retardant concentrate. In certain aspects, depending on the ratio of the SAP concentrate to the long-term fire-retardant concentrate in the composition, when admixed with water the composition either: (i) forms a gel solution that has long-term fire-retardant properties or (ii) forms a long-term fire-retardant solution with increased water absorbency (e.g., as compared to an equivalent fire-fighting solution prepared without the SAP).

In certain aspects, the SAP concentrate is a dry powder. In certain aspects, the SAP concentrate is a non-aqueous liquid. In certain aspects, the non-aqueous liquid SAP concentrate comprises less than about 5%, 4%, 3%, 2%, 1%, 0.5%, or 0.1% free water.

In certain aspects, the long-term fire-retardant concentrate is a dry powder. In certain aspects, the long-term fire-retardant concentrate is an aqueous liquid that contains less than about 1%, 0.9%, 0.8%, 0.7%, 0.6%, 0.5%, 0.4%, 0.3%, 0.2%, or 0.1% free water or that contains no free water.

In certain aspects, the SAP concentrate is a non-aqueous liquid and the long-term fire-retardant concentrate is an aqueous liquid that contains less than about 1%, 0.9%, 0.8%, 0.7%, 0.6%, 0.5%, 0.4%, 0.3%, 0.2%, or 0.1% free water or that contains no free water. In certain aspects, the non-aqueous liquid SAP concentrate comprises less than about 5%, 4%, 3%, 2%, 1%, 0.5%, or 0.1% free water. Thus, in certain aspects, the free water content of the composition is less than about 5%, 4%, 3%, 2%, 1%, 0.5%, or 0.1%.

In certain aspects, the SAP concentrate is a non-aqueous liquid and the long-term fire-retardant concentrate is a dry powder. In certain aspects, the non-aqueous liquid SAP concentrate comprises less than about 5%, 4%, 3%, 2%, 1%, 0.5%, or 0.1% free water. Thus, in certain aspects, the free water content of the composition is less than about 5%, 4%, 3%, 2%, 1%, 0.5%, or 0.1%.

In certain aspects, the SAP concentrate is a dry powder and the long-term fire-retardant concentrate is an aqueous liquid that contains less than about 1%, 0.9%, 0.8%, 0.7%, 0.6%, 0.5%, 0.4%, 0.3%, 0.2%, or 0.1% free water or that contains no free water.

In certain aspects, the SAP concentrate is a dry powder and the long-term fire-retardant concentrate is a dry powder.

In any of the aspects disclosed herein, the composition can comprise about 1 to 99 parts SAP concentrate to about 99 to 1 parts long-term fire-retardant concentrate, or about 2 to 98 parts SAP concentrate to about 98 to 2 parts long-term fire-retardant concentrate, or about 5 to 95 parts SAP concentrate to about 95 to 5 parts long-term fire-retardant concentrate, or about 10 to 90 parts SAP concentrate to about 90 to 10 parts long-term fire-retardant concentrate, or about 15 to 85 parts SAP concentrate to about 85 to 15 parts long-term fire-retardant concentrate, or about 20 to 80 parts SAP concentrate to about 80 to 20 parts long-term fire-retardant concentrate, or about 25 to 75 parts SAP concentrate to about 75 to 25 parts long-term fire-retardant concentrate, or about 30 to 70 parts SAP concentrate to about 70 to 30 parts long-term fire-retardant concentrate, or about 40 to 60 parts SAP concentrate to about 60 to 40 parts long-term fire-retardant concentrate, or about 50 parts SAP concentrate to about 50 parts long-term fire-retardant concentrate. In aspects, the composition comprises about 90 parts SAP concentrate to about 10 parts long-term fire-retardant concentrate. In aspects, the composition comprises about 50 parts SAP concentrate and about 50 parts long-term fire-retardant concentrate. In other aspects, the composition comprises about 10 parts SAP concentrate and about 90 parts long-term fire-retardant concentrate.

In any of the aspects disclosed herein, the long-term fire-retardant concentrate can comprise an ammonium phosphate fire retardant or an ammonium sulfate fire retardant. In certain aspects, the ammonium phosphate fire retardant can comprise monoammonium phosphate and/or diammonium phosphate or the ammonium sulfate fire retardant can comprise diammonium sulfate. In other aspects, the fire retardant can comprise a combination of any of the above mentioned ammonium phosphates or ammonium sulfate or mixtures thereof.

In any of the aspects disclosed herein, the super absorbent polymer (SAP) can comprise a potassium and/or sodium polyacrylate, a polyacrylamide, a mineral oil, a vegetable oil or combinations thereof.

In any of the aspects disclosed herein, the long-term fire-retardant concentrate can further comprise one or more of a thickening agent, a corrosion inhibitor, a coloring agent, a flow conditioner, or a functional component. In certain aspects, the long-term fire retardant thickener is xanthan. In any of the aspects disclosed herein, the SAP concentrate comprises one or more of a non-aqueous liquid, a stabilizer, a coloring agent, or a thickener. In others aspects, the thickener component in a liquid SAP can be an attapulgus clay. In certain aspects, however, the composition does not contain a thickener. In any of the aspects disclosed herein, the composition can have a viscosity within the range of 100 to >10,000 cP.

The present disclosure also provides for methods of producing aqueous fire-fighting solutions. In certain aspects, the method comprises mixing 0.1 parts to 15 parts of any of the aforementioned compositions with 85 parts to 99.9 parts of water. In certain aspects, the aqueous fire-fighting solution exhibits a consistency ranging from slightly viscous to a semi-solid paste. In certain aspects, the method comprises mixing about 15 parts of the composition with about 85 parts water. In certain aspects, the aqueous fire-fighting solution produced has a viscosity greater than about 10,000 cP. In certain aspects, the aqueous fire-fighting solution produced has long-term fire-retardant properties.

The present disclosure also provides for methods of producing fire-fighting solutions comprising mixing a first concentrate (either an SAP or a long-term fire-retardant concentrate) with water to form a diluted concentrate. The diluted concentrate is then mixed with a second concentrate to form the fire-fighting solution. The second concentrate comprises (i) an SAP if the first concentrate comprises the long-term fire-retardant concentrate, or (ii) a long-term fire retardant concentrate when the first concentrate comprises the SAP.

The present disclosure also provides for an aqueous fire-fighting solution made by any of the methods of producing an aqueous fire-fighting solution disclosed herein. In certain aspects, the aqueous fire-fighting solution can be slightly viscous. In certain aspects, the solution can be a semi-solid paste. In certain aspects, the solution can have a viscosity that is greater than 10,000 cP. Further, in certain aspects, the solution can have long-term fire-retardant properties.

The present disclosure also provides for methods of making a composition for producing an aqueous fire-fighting solution. In certain aspects, the method comprises mixing a SAP concentrate and a long-term fire-retardant concentrate. In certain aspects, the SAP concentrate and long-term fire-retardant concentrate is blended together and then mixed with water and the aqueous fire-fighting solution produced is a gel solution that has long-term fire-retardant properties or is a long-term fire-retardant solution with increased water absorbency, depending on the ratio of the SAP concentrate to the long-term fire-retardant concentrate in the composition. In certain aspects either the SAP concentrate or the long-term fire-retardant concentrate is diluted with a first portion of water before it is combined with the other concentrate and prior to full-dilution to form the fire-fighting solution. In certain aspects, the SAP concentrate is a non-aqueous liquid or a dry powder. In certain aspects, the long-term fire-retardant concentrate is an aqueous liquid that contains less than about 1%, 0.9%, 0.8%, 0.7%, 0.6%, 0.5%, 0.4%, 0.3%, 0.2%, or 0.1% free water or that contains no free water. In certain aspects, the SAP concentrate is a non-aqueous liquid and the long-term fire-retardant concentrate is an aqueous liquid that contains less than about 1%, 0.9%, 0.8%, 0.7%, 0.6%, 0.5%, 0.4%, 0.3%, 0.2%, or 0.1% free water or that contains no free water. In certain aspects, the SAP concentrate is a non-aqueous liquid and the long-term fire-retardant concentrate is a dry powder. In certain aspects, the SAP concentrate is a dry powder and the long-term fire-retardant concentrate is an aqueous liquid that contains less than about 1%, 0.9%, 0.8%, 0.7%, 0.6%, 0.5%, 0.4%, 0.3%, 0.2%, or 0.1% free water or that contains no free water. In certain aspects, the SAP concentrate is a dry powder and the long-term fire-retardant concentrate is a dry powder. In all cases, the SAP concentrate and the long-term fire retardant concentrate is admixed, forming a homogeneous composition before free water is added to prepare a liquid.

In any aspects of the methods disclosed herein, the composition can comprise about 1 to 99 parts SAP concentrate to about 99 to 1 parts long-term fire-retardant concentrate, or about 2 to 98 parts SAP concentrate to about 98 to 2 parts long-term fire-retardant concentrate, or about 5 to 95 parts SAP concentrate to about 95 to 5 parts long-term fire-retardant concentrate, or about 10 to 90 parts SAP concentrate to about 90 to 10 parts long-term fire-retardant concentrate, or about 15 to 85 parts SAP concentrate to about 85 to 15 parts long-term fire-retardant concentrate, or about 20 to 80 parts SAP concentrate to about 80 to 20 parts long-term fire-retardant concentrate, or about 25 to 75 parts SAP concentrate to about 75 to 25 parts long-term fire-retardant concentrate, or about 30 to 70 parts SAP concentrate to about 70 to 30 parts long-term fire-retardant concentrate, or about 40 to 60 parts SAP concentrate to about 60 to 40 parts long-term fire-retardant concentrate, or about 50 parts SAP concentrate to about 50 parts long-term fire-retardant concentrate.

In any aspects of the methods disclosed herein, the long-term fire-retardant concentrate can comprise an ammonium phosphate fire retardant or an ammonium sulfate fire retardant. In certain aspects, the ammonium phosphate fire retardant comprises monoammonium phosphate, diammonium phosphate or condensed ammonium pyrophosphate, short-chain, water-soluble ammonium polyphosphates and the ammonium sulfate fire retardant comprises diammonium sulfate. In certain aspects, the fire retardant component comprises a mixture of any of the ammonium phosphates or ammonium sulfates.

In any aspects of the methods disclosed herein, the long-term fire-retardant concentrate can further comprise one or more of a thickening agent, corrosion inhibitors, coloring dyes or pigments, a flow conditioner, or a functional component. In certain aspects, the thickener is xanthan. In any aspects of the methods disclosed herein, the SAP concentrate can comprise one or more of a non-aqueous liquid, a stabilizer, a coloring agent, or a thickener. In certain aspects, the thickener in the liquid SAP concentrate is an attapulgite clay. In certain aspects, however, neither the long-term retardant, the SAP components nor the blend thereof contains a thickener. In certain aspects, the composition has a viscosity of >10,000 cP.

Further aspects provide for a method of preventing or combatting a fire utilizing, either directly or by addition of water, a composition and/or fire-fighting solution disclosed herein or a composition and/or fire-fighting solution produced by any method disclosed herein. In certain aspects, the fire is a wild-land fire, forest fire, or structure fire.

DETAILED DESCRIPTION

To the extent necessary to provide descriptive support, the subject matter and/or text of the appended claims is incorporated herein by reference in their entirety.

It will be understood by all readers of this written description that the exemplary aspects and embodiments described and claimed herein may be suitably practiced in the absence of any recited feature, element or step that is, or is not, specifically disclosed herein.

It is to be noted that the term "a" or "an" entity refers to one or more of that entity; for example, "a compound," is understood to represent one or more compounds. As such, the terms "a" (or "an"), "one or more," and "at least one" can be used interchangeably herein.

Furthermore, "and/or" where used herein is to be taken as specific disclosure of each of the specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

It is understood that wherever aspects are described herein with the language "comprising," otherwise analogous aspects described in terms of "consisting of" and/or "consisting essentially of" are also provided.

Unless defined otherwise, technical and scientific terms used herein have the same meaning as commonly understood by one of ordinary skill in the art to which this disclosure is related. Numeric ranges are inclusive of the numbers defining the range. Even when not explicitly identified by "and any range in between," or the like, where a list of values is recited, e.g., 1, 2, 3, or 4, the disclosure specifically includes any range in between the values, e.g., 1 to 3, 1 to 4, 2 to 4, etc.

Unless otherwise specified in reference to a specific instance, for the purposes of this disclosure and the appended claims, viscosity values are measured on a Brookfield model LVT under the following conditions: (i) when viscosity is 500 cP or above, spindle #4 at 60 rpm is used and (ii) when viscosity is less than 500 cP, spindle #2 at 60 rpm is used.

As used herein, "free water" refers to water in a composition and/or solution that is available to dissolve water soluble components or otherwise able to react. For example, without being bound by theory, it is believed that in certain aqueous solutions that do not contain free water, the dissolving capacity of the water is fully utilized to keep soluble ions in solution and that there is no "free water" present to dissolve additional water soluble components.

The headings provided herein are solely for ease of reference and are not limitations of the various aspects or aspects of the disclosure, which can be had by reference to the specification as a whole. Accordingly, the terms defined immediately below are more fully defined by reference to the specification in its entirety.

It has been discovered that SAP concentrates and long-term fire-retardant concentrates can form compositions when mixed together. Further, the resulting SAP/fire-retardant concentrate mixtures can subsequently absorb large volumes of water, resulting in solutions exhibiting a wide range of viscosities or semi-solid or solid pastes, depending on the ratio of the two concentrates in the mixture. This can occur when the SAP concentrate and/or the long-term fire-retardant concentrate is either a dry-powder concentrate or a liquid concentrate. Aqueous solutions prepared from mixtures of these two concentrates exhibit viscosities far greater than can be obtained from any thickener component that could optionally be in the retardant product. For example, at a standard liquid retardant mix ratio (e.g., a mixture of 5.5 parts water per 1.0 part of the concentrate), solutions prepared from a SAP concentrate and a long-term fire-retardant concentrate mixture exhibited viscosities greater than 10,000 cP.

Disclosed herein are compositions comprising a liquid or dry-powder SAP concentrate mixed with a liquid or dry-powder long-term fire-retardant concentrate, prior to dilution with water to prepare a fire-fighting solution, to form a mixed concentrate and methods of making such compositions. In certain aspects, during the mixing of the SAP concentrate and the long-term fire-retardant concentrate, where at least one is a liquid, the mixture thickens, passing through a pasty substance as the ratio of the fire-retardant:

SAP concentrate increases, and then reverts to a viscous liquid at high concentrations. The mixed concentrate composition can be subsequently mixed with water to produce an aqueous fire-fighting solution.

Thus, provided for herein are compositions for producing an aqueous, fire-fighting solution where the composition comprises a homogeneous mixture of a super absorbent polymer (SAP) concentrate and a long-term fire retardant concentrate. Suitable SAP concentrates include, for example, potassium and/or sodium polyacrylate or polyacrylamide (e.g., a liquid concentrate such as PHOS-CHEK INSUL-8 (U.S. Pat. No. 9,162,098, incorporated by reference herein), THERMOGEL 200L/300L (U.S. Pat. Nos. 5,989,446 and 6,245,242, both of which are incorporated by reference herein), BARRICADE I/II (U.S. Pat. No. 6,386, 293, incorporated by reference herein), FIREWALL II, and FIREWALL Ultra. The SAP may also be a copolymer emulsion, including emulsions optionally formulated with other components (e.g., surfactants). In certain embodiments the SAP can be a polyacrylamide copolymer emulsion, including polyacrylamide copolymer emulsions formulated with other components (e.g., surfactant(s)). One example of a polyacrylamide copolymer emulsion is BLAZETAMER 380. The SAP may also be a powder concentrate such as FIREICE 561, THERMOGEL 500P, or EARTHCLEAN TETRA KO XL-P). Suitable long-term fire-retardant concentrates include, PHOS-CHEK LC95A (U.S. Pat. Nos. 6,780,991, 6,828,437, 6,852,853 and, 6,905,639), PHOS-CHEK MVP-F, and PHOS-CHEK MVP-Fx; and fire retardant salts (e.g., monoammonium phosphate, diammonium phosphate, ammonium pyrophosphate, any short-chain, water-soluble ammonium polyphosphate, diammonium sulfate, and mixtures thereof, and 10-34-0 and 11-37-0 liquid fertilizer solution). In certain aspects, the long-term fire-fighting concentrate comprises an ammonium phosphate fire retardant. Further, in certain aspects, an ammonium phosphate fire retardant comprises monoammonium phosphate and/or diammonium phosphate and mixtures thereof. In certain aspects, an ammonium sulfate fire retardant comprises diammonium sulfate and/or mixtures thereof with any of the ammonium phosphates.

When mixed with water, the retardant/SAP concentrate composition can form a gel solution that has long-term fire-retardant properties—such as having a P205 content that alters pyrolysis and being functional in the absence of water—or the concentrate composition can form a long-term fire-retardant solution with increased water absorbency. As used herein, the term "increased water absorbency" is to be understood as capable of absorbing more water than an equivalent solution prepared with the long-term fire retardant alone (e.g., without the SAP). Also, in some embodiments, the gel solution has a viscosity greater than about 1,000 cP, greater than about 5,000 cP or greater than about 10,000 cP. In further embodiments, the long term fire-retardant solution with increased water absorbency has a viscosity less than about 1,000 cP, less than about 800 cP, less than about 500 cP, or less than about 300 cP. Whether the concentrate composition forms a gel solution that has long-term fire-retardant properties or a long-term fire-retardant solution with increased water absorbency depends on the ratio of the SAP concentrate to the long-term fire-retardant concentrate in the mixed component concentrate composition. In certain aspects, the SAP concentrate is a dry powder. In certain aspects, the dry powder is sodium or potassium polyacrylate or polyacrylamide. In certain other aspects, the SAP concentrate is a non-aqueous liquid. In certain aspects, the non-aqueous liquid is mineral oil or a vegetable oil such as canola oil or a mixture thereof. As used herein, a non-aqueous liquid SAP concentrate is not necessarily completely devoid of water. For example, in certain aspects the liquid SAP concentrate comprises less than about 5%, 4%, 3%, 2%, 1%, 0.5%, or 0.1% free water by weight. In certain aspects, the long-term fire-retardant concentrate is a dry powder. In certain other aspects, the long-term fire-retardant concentrate is an aqueous liquid that contains less than about 1%, 0.9%, 0.8%, 0.7%, 0.6%, 0.5%, 0.4%, 0.3%, 0.2%, or 0.1% free water or that contains no free water.

Both dry-powder concentrates and liquid concentrates of the SAP concentrate can be mixed with either dry-powder concentrates or liquid concentrates of the long-term fire-retardant concentrate to form a composition that can subsequently be diluted with water to produce an aqueous fire-fighting solution exhibiting both long-term fire-retardant and fire-suppressant capabilities. Thus, in certain aspects, the SAP concentrate is a non-aqueous liquid and the long-term fire-retardant concentrate is an aqueous liquid that contains less than about 1%, 0.9%, 0.8%, 0.7%, 0.6%, 0.5%, 0.4%, 0.3%, 0.2%, or 0.1% free water or that contains no free water, as either is described anywhere herein. In certain aspects, the SAP concentrate is a non-aqueous liquid and the long-term fire-retardant concentrate is a dry powder, as either is described anywhere herein. In certain aspects, the SAP concentrate is a dry powder and the long-term fire-retardant concentrate is an aqueous liquid that contains less than about 1%, 0.9%, 0.8%, 0.7%, 0.6%, 0.5%, 0.4%, 0.3%, 0.2%, or 0.1% free water or that contains no free water, as either is described anywhere herein. In certain aspects, both the SAP concentrate and the long-term fire-retardant concentrate are dry powders, as either is described anywhere herein. In certain aspects, the free water content of the composition for producing an aqueous fire-fighting solution is less than about 5%, 4%, 3%, 2%, 1%, 0.5%, or 0.1% by weight.

The amount of SAP concentrate to long-term fire-retardant concentrate in the composition for producing an aqueous fire-fighting solution can vary (e.g., the ratio of the two). In certain aspects, the composition comprises about 1 to 99 parts by volume or weight SAP concentrate to about 99 to 1 parts by volume or weight long-term fire-retardant concentrate. In certain aspects, the composition comprises about 2 to 98 parts by volume or weight SAP concentrate to about 98 to 2 parts by volume or weight long-term fire-retardant concentrate. In certain aspects, the composition comprises about 3 to 97 parts by volume or weight SAP concentrate to about 97 to 3 parts by volume or weight long-term fire-retardant concentrate. In certain aspects, the composition comprises about 4 to 96 parts by volume or weight SAP concentrate to about 96 to 4 parts by volume or weight long-term fire-retardant concentrate. In certain aspects, the composition comprises about 5 to 95 parts by volume or weight SAP concentrate to about 95 to 5 parts by volume or weight long-term fire-retardant concentrate. In certain aspects, the composition comprises about 10 to 90 parts by volume or weight SAP concentrate to about 90 to 10 parts by volume or weight long-term fire-retardant concentrate. In certain aspects, the composition comprises about 15 to 85 parts by volume or weight SAP concentrate to about 85 to 15 parts by volume or weight long-term fire-retardant concentrate. In certain aspects, the composition comprises about 20 to 80 parts by volume or weight SAP concentrate to about 80 to 20 parts by volume or weight long-term fire-retardant concentrate. In certain aspects, the composition comprises about 25 to 75 parts by volume or weight SAP concentrate to about 75 to 25 parts by volume or weight long-term fire-retardant concentrate. In certain aspects, the composition comprises about 30 to 70 parts by volume or weight SAP concentrate to about 70 to 30 parts by volume or weight long-term fire-retardant concentrate. In certain aspects, the composition comprises about 40 to 60 parts by volume or weight SAP concentrate to about 60 to 40 parts by volume or weight long-term fire-retardant concentrate. In certain aspects, the composition comprises about 50 parts by volume or weight SAP concentrate to about 50 parts by volume or weight long-term fire-retardant concentrate.

For example, in certain aspects, the composition comprises about 90 parts by volume or weight SAP concentrate to about 10 parts by volume or weight long-term fire-retardant concentrate. In other aspects, the composition comprises about 10 parts by volume or weight of the SAP concentrate to about 90 parts by volume or weight of the long-term fire-retardant concentrate. In still further aspects, the composition comprises about 50 parts by volume or weight of the SAP concentrate to about 50 parts by volume or weight of the long-term fire retardant concentrate.

Certain aspects provide for the inclusion of additional components in the composition for producing an aqueous fire-fighting solution. In certain aspects, the long-term fire-retardant concentrate can comprise one or more thickening agents (thickeners), corrosion inhibitors, coloring agents, flow conditioners, or other functional components. In certain aspects, the thickener is a biopolymer, e.g., rhamsan, welan, or xanthan. In certain aspects, the thickener is xanthan. In certain aspects, the SAP concentrate can comprise one or more of a non-aqueous liquid, a stabilizer, a coloring agent, or a thickener. In some aspects, the thickener is a clay (e.g., attapulgite clay). One of ordinary skill in the art will recognize that if the SAP concentrate and/or the long-term fire-retardant concentrate comprise one or more of these additives, then a concentrate composition formed by the mixture of the SAP concentrate and the long-term fire-retardant concentrate can comprise these additives as well. Because the composition comprising a homogenous mixture of SAP concentrate and long-term fire-retardant concentrate itself can be viscous, in certain aspects, the composition does not contain a thickener. In certain aspects, the composition for producing an aqueous fire-fighting solution is viscous or highly viscous. In certain aspects, the composition has a viscosity of greater than 10,000 cP.

Provided herein are methods of producing an aqueous fire-fighting solution. In certain aspects, the methods comprise mixing a composition for producing an aqueous fire-fighting solution described anywhere herein with water. In certain aspects, the methods comprise mixing 0.1 to 15 parts by volume of the composition with 85 to 99.9 parts by volume water. For example, in certain aspects, the methods comprise mixing about 15 parts by volume of the composition for producing an aqueous fire-fighting solution with about 85 parts by volume water. In certain aspects, the fire-fighting solution produced is slightly viscous or a semi-solid that would be expected to cling to vertical and sloped fuels such as structural walls and roofs. In certain aspects, the fire-fighting solution produced has a viscosity that is greater than about 500 cP, 1,000 cP, 2,500 cP, 5,000 cP, or 10,000 cP. In certain aspects, the fire-fighting solution exhibits long-term fire-retardant properties.

In some aspects, the method of producing an aqueous fire-fighting solution involves first preparing a diluted version of either the SAP concentrate or the long-term fire retardant concentrate, followed by addition of the other concentrate.

In other aspects, the method of producing an aqueous fire-fighting solution described herein can further comprise preparing a diluted concentrate of either the SAP or the long-term fire retardant before further dilution. For instance, either the SAP or the long-term fire retardant may be mixed with a first portion of water to form the diluted concentrate. The diluted concentrate may then be mixed with the other, undiluted, concentrate and additional water to form the fire-fighting solution.

Provided herein are aqueous fire-fighting solutions made by any of the methods described herein of mixing a concentrate composition for producing an aqueous fire-fighting solution with water. In certain aspects, the fire-fighting solution is slightly viscous. In certain aspects, the fire-fighting solution is a highly viscous solution. In certain aspects, the fire-fighting solution has a viscosity that is greater than about 500 cP, 1,000 cP, 2,500 cP, 5,000 cP, or 10,000 cP. In certain aspects, the fire-fighting solution exhibits long-term fire-retardant properties.

Provided herein are methods of making a fire-fighting concentrate. In certain aspects, the method comprises mixing a SAP concentrate and a long-term fire-retardant concentrate as either are described anywhere herein.

In certain aspects, when the composition comprising the SAP concentrate and the long-term fire-retardant concentrate are mixed with water, an aqueous fire-fighting solution is produced that forms a gel solution that has long-term fire-fighting properties or a long-term fire-fighting retardant solution is produced with increased water absorbency. These characteristics can be varied depending on the ratio of the SAP concentrate to the long-term fire-retardant concentrate in the composition for producing an aqueous fire-fighting solution. In certain aspects, the SAP concentrate can be a non-aqueous liquid or a dry powder as described anywhere else herein. In certain aspects, the long-term fire-retardant concentrate can be an aqueous liquid that contains less than about 1%, 0.9%, 0.8%, 0.7%, 0.6%, 0.5%, 0.4%, 0.3%, 0.2%, or 0.1% free water or that contains no free water or a dry powder as described anywhere else herein. For example, in certain aspects, the SAP concentrate is a non-aqueous liquid and the long-term fire-retardant concentrate is an aqueous liquid that contains less than about 1%, 0.9%, 0.8%, 0.7%, 0.6%, 0.5%, 0.4%, 0.3%, 0.2%, or 0.1% free water or that contains no free water, or the SAP concentrate is a non-aqueous liquid and the long-term fire-retardant concentrate is a dry powder, or the SAP concentrate is a dry powder and the long-term fire-retardant concentrate is an aqueous liquid that contains less than about 1%, 0.9%, 0.8%, 0.7%, 0.6%, 0.5%, 0.4%, 0.3%, 0.2%, or 0.1% free water or that contains no free water, or the SAP concentrate is a dry powder and the long-term fire-retardant concentrate is a dry powder.

In certain aspects, the composition for producing an aqueous fire-fighting solution (e.g., the fire-fighting concentrate) comprises about 1 to 99 parts by volume SAP concentrate to about 99 to 1 parts by volume long-term fire-retardant concentrate. In certain aspects, the composition comprises about 2 to 98 parts by volume SAP concentrate to about 98 to 2 parts by volume long-term fire-retardant concentrate. In certain aspects, the composition comprises about 3 to 97 parts by volume SAP concentrate to about 97 to 3 parts by volume long-term fire-retardant concentrate. In certain aspects, the composition comprises about 4 to 96 parts by volume SAP concentrate to about 96 to 4 parts by volume long-term fire-retardant concentrate. In certain aspects, the composition comprises about 5 to 95 parts by volume SAP concentrate to about 95 to 5 parts by volume long-term fire-retardant concentrate. In certain aspects, the composition comprises about 10 to 90 parts by volume SAP concentrate to about 90 to 10 parts by volume long-term fire-retardant concentrate. In certain aspects, the composition comprises about 15 to 85 parts by volume SAP concentrate to about 85 to 15 parts by volume long-term fire-retardant concentrate. In certain aspects, the composition comprises about 20 to 80 parts by volume SAP concentrate to about 80 to 20 parts by volume long-term fire-retardant concentrate. In certain aspects, the composition comprises about 25 to 75 parts by volume SAP concentrate to about 75 to 25 parts by volume long-term fire-retardant concentrate. In certain aspects, the composition comprises about 30 to 70 parts by volume SAP concentrate to about 70 to 30 parts by volume long-term fire-retardant concentrate. In certain aspects, the composition comprises about 40 to 60 parts by volume SAP concentrate to about 60 to 40 parts by volume long-term fire-retardant concentrate. In certain aspects, the composition comprises about 50 parts by volume SAP concentrate to about 50 parts by volume long-term fire-retardant concentrate. For example, in certain aspects, the composition comprises about 90 parts by volume SAP concentrate to about 10 parts by volume long-term fire-retardant concentrate.

In certain aspects, the composition for producing an aqueous fire-fighting solution is highly viscous. In certain aspects, the composition for producing an aqueous fire-fighting solution has a low viscosity, e.g., >100 cP.

Method of Combatting a Fire

Disclosed herein are methods of combatting a fire by applying a fire-fighting solution described anywhere herein for the purpose of suppressing, containing, controlling or extinguishing, etc., a fire. In certain embodiments, the fire-fighting solution is applied directly on a flaming fuel. In other embodiments, the fire-fighting solution is applied indirectly, e.g., in front of or parallel to an advancing fire front. The distance between the advancing fire and the application site of the fire-fighting solution depends on the rate the solution can be applied, the rate of spreading of the moving fire front and the presence or absence of a natural fuel break identified, for instance, by changes in geometry of the ground or structure being threatened. In certain embodiments, the fire-fighting solution is applied from a ground platform such as a fire-engine. In certain embodiments, the fire-fighting solution is applied from an aerial platform such as a fixed-wing aircraft or a rotary-wing aircraft. In certain embodiments, the fire-retardant solution is applied from a helicopter bucket which is slung before the helicopter and in other embodiments the fire retardant solution is contained within tanks mounted in or attached externally to the helicopter. In other embodiments, the fire-retardant solution is applied from a mix of all those listed vehicles or platforms.

In certain embodiments the fire is a wildfire or a structural fire. Thus, the fuel may comprise natural vegetation (e.g., trees, grass, such as in a wildfire) or may be a man-made structure (e.g., house or building). Thus, in some embodiments, the fire-fighting solution is applied directly to a structural support or sloped surface on the structure (e.g., a wall or a roof).

The following examples are included to demonstrate certain aspects and embodiments of the disclosure. It should be appreciated by those of skill in the art that the techniques disclosed in the examples which follow represent techniques discovered by the inventor to function well in the practice of the disclosure. However, those of skill in the art should, in light of the present disclosure, appreciate that many changes can be made in the specific aspects and embodiments which are disclosed and still obtain a like or similar result without departing from the spirit and scope of the disclosure.

EXAMPLES

Example 1. Blends of Super Absorbent Polymer (SAP) Solution and Long-Term Fire-Retardant Salts and Concentrates Three random 1% water solutions of a liquid SAP were taken (each with ~>10,000 cP viscosity) and a small scoop (~2 grams) of monoammonium phosphate (MAP) was added to the first SAP solution, an equal amount of 11-37-0 (liquid fertilizer solution) was added to the second SAP solution, and an equal amount of a formulated liquid ammonium phosphate containing fire-retardant concentrate was added to the third solution. Within seconds, all three of the viscous gel solutions became water-like, i.e., viscosity <10 cP. This illustrates the deleterious impact of metal and alkali metal ions on the ability of a SAP to absorb and hold water.

Example 2. Blends of Liquid SAP Concentrates and Long-Term Fire-Retardant Concentrates Studies were conducted to characterize the mixing of a liquid super absorbent polymer (SAP) concentrate and a liquid long-term fire-retardant concentrate. Tables 1 and 2 show the composition of these two concentrates, respectively.

TABLE 1

Representative formulation of a liquid gel concentrate and use.

| Components | Percent by Weight in Wet or Dry Concentrate | Percent by Weight in Dilute Solution at Preferred Use levels |
|---|---|---|
| Polyacrylic Acid Crosslinked with Allyl Sucrose | 20.5 | 0.07-0.62 |
| Triethanolamine | 15.8 | 0.05-0.47 |
| Mineral Oil | 46.0 | 0.15-1.38 |
| Propylene carbonate | 0.8 | <0.01-0.02 |
| Water-free organophilic clay | 2.3 | <0.01-0.07 |
| Canola Oil | 14.6 | 0.05-0.44 |
| Lecithin | <1.0 | <0.001 |

TABLE 2

Representative Composition of a Liquid Long-Term Fire-Retardant Concentrate.

| Raw Materials | Weight added in % |
|---|---|
| 10-34-0 to 11-37-0* | 93.0 to 95.0 |
| Xanthan thickener | 1.0 to 2.0 |
| Attapulgus Clay | 1.0 to 2.0 |
| Other non-thickening additives, e.g., color | <5.0 |
| Total | 100.0 |

*10-34-0 and 11-37-0 are water solutions of a mixture of ammonium ortho, pyro, and polyphosphates.

Three blends of the two concentrates were prepared, i.e., liquid fire-retardant (LFR) concentrate:liquid SAP (LSAP) concentrate ratios of 90:10, 50:50 and 10:90 on a volume basis. Two hundred milliliter samples were made in a glass beaker; a plastic syringe was used to inject each concentrate into the glass beaker. When both concentrates had been added, they were mixed with a spatula until no change in color or consistency was observed (~3 minutes). Duplicate samples were prepared to confirm reproducibility. The composition, viscosity and density of the three concentrate mixtures are illustrated in Table 3. The characteristics of the two unadulterated concentrates are included in the Table for comparison purposes.

TABLE 3

Representative Composition of Liquid Fire-Retardant:Liquid SAP (LFR:LSAP) Concentrate Mixtures.

| Sample | Composition (%)* LFR:LSAP | Concentrate Viscosity (cP) | Specific Gravity |
|---|---|---|---|
| LFR | 100:00 | 172 | 1.470 |
| A | 90:10 | 590 | 1.381 |
| B | 50:50 | >10,000 | 1.172 |
| C | 10:90 | 1673 | 1.048 |
| LSAP | 00:100 | 923 | 1.000 |

*Mixing conducted on volume basis.

It should be understood that a viscosity measurement of >10,000 cP is provided when the viscosity of the solution is greater than that measurable by the rotational viscometer used in this study, i.e., a Brookfield Model LVT, fitted with spindle 4 rotating at 60 rpm unless specified otherwise. This >10,000 value should therefore be interpreted as meaning greater than 10,000 cP. Not all >10,000 cP measurements should be considered equal, i.e., the notation >10,000 cP indicates only that the viscosity of the solution is above 10,000 cP and could be, e.g., 10,100 cP or 100,000 cP, or even more.

The mixed concentrates were then diluted at a 5.5:1 (water:concentrate mixture) mix ratio, a 15.3% aqueous solution of the concentrate mixture to make the solutions. Due to the high viscosity of the concentrates, samples B, C, and the liquid SAP were measured by weight rather than volume. A 600 mL beaker was placed on the weighing scale, tared and the amount of concentrate was added; the scale was tared again and the proper amount of tap water added. The diluted solutions were mixed on a laboratory mixer with a 1.5-inch propeller blade for 5 minutes. All diluted solutions, except C, were mixed at 2100 rpm. This speed was inadequate to dilute sample C. That sample was mixed at greater than 4,000 rpm because of its extreme viscosity.

It is well known that the viscosity of aqueous gel solutions can be dramatically impacted by small amounts of metal and alkali metal ions in the solution, e.g., water hardness ions at parts-per-million levels have a significant impact on the viscosity of gel solutions. This was confirmed in preliminary experiments. In view of this, it would have been expected that aqueous retardant-salt-containing concentrates would have prevented the liquid SAP concentrate from absorbing large volumes of water sufficient to increase its viscosity. Likewise, since the liquid SAP concentrate is essentially void of water, it would have been expected that the biopolymer thickener in the retardant concentrate would not "hydrate." Thus, mixtures of the two concentrates would not have been expected to result in an increase in viscosity. Without being bound by theory, the data in Table 3, however, illustrates a dramatic increase in the viscosity of mixtures.

Table 4 illustrates the composition and viscosity of solutions prepared from the mixture of concentrates from Table 3. The composition, viscosity and density of these solutions are illustrated in Table 5. Individual concentrates are included in the Tables for comparison purposes.

TABLE 4

Composition and Viscosity of Aqueous Solutions
Prepared with Liquid Fire-Retardant Concentrate:Liquid
SAP (LFR:LSAP) Concentrate Mixtures.

| Sample | Composition (%) LFR:LSAP | Composition of Diluted Solution* | | Brookfield Viscosity of Solution (cP) |
| | | % LFR (conc.) | % LSAP (conc.) | |
|---|---|---|---|---|
| LFR | 100:00 | 21.0 | 0.0 | 227 |
| A | 90:10 | 18.0 | 2.0 | 550 |
| B | 50:50 | 9.0 | 9.0 | >10,000 |
| C | 10:90 | 1.6 | 14.4 | >10,000 |
| LSAP | 00:100 | 0.0 | 2.0 | >10,000 |

*Solutions prepared by mixing 1.0 volume of concentrate with 5.5 volumes of water.

TABLE 5

Liquid SAP Concentrate: Liquid Fire-Retardant Mixtures (LSAP:LFR) and Their Solutions.

| Sample | | Mixtures | 1st Test | | | 2nd Duplicate Test | | | Observations for 1st and 2nd Test |
| | | | Viscosity (cP) @60 rpm | | | Viscosity (cP) @60 rpm | | | |
| | | | Spindle #2 | Spindle #4 | Specific Gravity | Spindle #2 | Spindle #4 | Specific Gravity | |
|---|---|---|---|---|---|---|---|---|---|
| LFR | Conc. | 100% LFR | 172 | * | 1.470 | 99 | * | 1.470 | Slightly thickened solution. |
| | Solution | 5.5:1 Solution | 227 | * | 1.095 | 220 | * | 1.084 | Homogeneous low viscosity solution. |
| A | Conc. | 10% LSAP: 90% LFR | * | 590 | 1.381 | * | 553 | 1.392 | Medium viscosity; homogeneous solution suspension. |
| | Solution | 5.5:1 Solution | 448 | 550 | * | 465 | 563 | * | Homogeneous medium viscosity liquid. |
| B | Conc. | 50% LSAP: 50% LFR | * | >10,000 | 1.172 | * | >10,000 | 1.175 | Homogenized mixture was pasty; did not drip from a spatula. |
| | Solution | 5.5:1 Solution | * | >10,000 | * | * | >10,000 | * | Homogeneous dark orange paste. |
| C | Conc. | 90% LSAP: 10% LFR | * | 1673 | 1.048 | * | 1593 | 1.062 | Not homogenous liquid; mixture dripped from spatula. |
| | Solution | 5.5:1 Solution | * | >10,000 | * | * | >10,000 | * | The mixer was unable to homogenize the entire sample. |
| LSAP | Conc. | 100% LSAP | * | 923 | 1.000 | * | 940 | 1.0 | Viscous gel |

* Indicates measurement was not taken.

In another experiment, a liquid fire-retardant concentrate was prepared without a biopolymer thickener (See Table 6). The concentrate was mixed with a lab mixer fitted with a 2-inch Cowles turbine blade for 20 minutes at about 4,000 rpm. The concentrate was diluted at a 5.5:1 ratio using a lab mixer fitted with a 1.5 inch propeller blade for 5 minutes at 2100 rpm. The liquid SAP concentrate was mixed with the liquid fire-retardant concentrate at ratios of 10:90 and 50:50. The characteristics of these solutions are illustrated in Table 6.

TABLE 6

Mixtures of Liquid Super Absorbent Polymer Concentrate and a Liquid
Fire-Retardant: Formulation Without a Thickener Component.

| Concentrate Sample | | Mixtures | 1st Test | | | Observations for 1st and 2nd Test |
| | | | Viscosity (cP) @60 rpm | | | |
| | | | Spindle #2 | Spindle #4 | Specific Gravity | |
|---|---|---|---|---|---|---|
| LFR Without biopolymer thickener | Concentrate | 100% LFR | 100 | * | 1.471 | Water-like liquid suspension. |
| | Solution | 5.5:1 Solution | 7 | * | 1.084 | Liquid, water-like. |

TABLE 6-continued

Mixtures of Liquid Super Absorbent Polymer Concentrate and a Liquid
Fire-Retardant: Formulation Without a Thickener Component.

| | | | 1st Test | | | |
|---|---|---|---|---|---|---|
| | | | Viscosity (cP) @60 rpm | | | |
| Concentrate Sample | | Mixtures | Spindle #2 | Spindle #4 | Specific Gravity | Observations for 1st and 2nd Test |
| 10% LSAP: 90% LFR | Concentrate | 10% LSAP: 90% LFR | * | 590 | 1.389 | Medium viscosity liquid; homogeneous. |
| | Solution | 5.5:1 Solution | 13 | 50 | * | Liquid water-like. |
| 50% LSAP: 50% LFR | Concentrate | 50% LSAP: 50% LFR | * | >10,000 | 1.194 | Mixture dripped from spatula; homogeneous. |
| | Solution | 5.5:1 Solution | * | >10,000 | * | Homogeneous; pasty. |

* Indicates measurement was not taken due to the extreme viscosity of the sample.

The elimination of a biopolymer thickener from the long-term fire-retardant concentrate did not appear to have a significant impact on the viscosity of the long-term fire-retardant concentrate but did, as expected, reduce the viscosity of the solution prepared therefrom to a water-like consistency. A mixture containing 10% LSAP concentrate and 90% liquid fire-retardant concentrate exhibited a medium viscosity although its solution was water-like. The sample prepared with 50% liquid SAP and 50% liquid fire-retardant concentrate provided solutions with Brookfield viscosities above 10,000 cP.

Example 3. Blends of Dry-Powder Ammonium Phosphates and Liquid SAP Concentrate

TABLE 7

Representative Composition of Mixed Concentrates.

| Raw Materials | 1 % | 2 % | 3 % |
|---|---|---|---|
| Liquid SAP concentrate | 90.83 | 54.13 | 17.45 |
| Monoammonium phosphate (MAP) | 8.16 | 40.82 | 73.47 |
| Diammonium phosphate (DAP) | 1.01 | 5.05 | 9.08 |
| Total | 100.00 | 100.00 | 100.00 |

Samples were mixed using a spatula until no further change in the consistency of the mixture was observed.

The concentrate mixtures were then diluted using a 5.5:1 concentrate mixture to water weight ratio, i.e., a 15.3% solution of the concentrate mixture. Solutions were prepared using a 2-inch Cowles turbine blade. Stirring was done at 1500 rpm for a maximum of 5 minutes.

TABLE 8

Properties of Mixed Concentrates (from Table 7).

| Sample ID | 10-min Viscosity | 24-hour Viscosity | Specific Gravity |
|---|---|---|---|
| 1 | 550 | 550 | 1.031 |
| 2 | 1,100 | 1,000 | 1.264 |
| 3 | N/A | N/A | N/A |

N/A—No reading obtained—the sample was a dry solid. In this case, the amount of liquid provided in the liquid SAP was inadequate to wet the dry-powder fire-retardant salts, consequently, viscosity could not be measured.

TABLE 9

Composition and Properties of Solutions from Concentrates in Table 8.
Solutions/Dilutes - 15.38 wt %

| Solution ID | wt % LSAP | wt % MAP | wt % DAP | 10 min | 24 hrs | pH | S.G |
|---|---|---|---|---|---|---|---|
| 1 | 14.12 | 1.26 | 0.16 | >10K | >10K | 4.86 | 0.905 |
| 2 | 9.10 | 6.28 | 0.78 | 4,250 | 5,800 | 4.93 | 1.008 |
| 3 | 4.08 | 11.30 | 1.40 | 13 | 20 | 4.99 | 1.052 |

Observations

1 Concentrate: Yellow suspension with crystals settling to bottom.

1 Solution: High viscosity gel/paste.

2 Concentrate: Slurry containing a lot of salt crystals.

2 Solution: Solution has a gel consistency.

Concentrate: Retardant salts form lumps when LSAP is added. Mixture appears to consist of a lot of salt "lumps" that are semi-wet.

3 Solution: Solution is water-like. Mixture is incompatible, i.e., forms two layers, the top layer appears to be a gel and the bottom layer is a semi-opaque water-like layer.

Example 4. Blends of Dry-Powder SAP Concentrate with Liquid Long-Term Fire-Retardant Concentrate and Their Solutions In this study the potassium salt of polyacrylic acid (KPA, potassium polyacrylate), a dry-powder SAP (DPSAP) was mixed with a liquid fire-retardant solution containing less than 1% free water. One thousand grams of the liquid fire-retardant solution was prepared. The composition of this solution is illustrated in Table 2.

All powders were thoroughly blended prior to mixing with the liquid fire retardant. All contents were mixed on a laboratory mixer fitted with a 2-inch Cowles turbine blade. Mixing was continued for 20 minutes at a rotational speed of 5,000 rpm.

KPA and the liquid fire retardant (LFR) were combined at three different weight ratios. 10:90, 50:50 and 90:10. 400-gram samples were made.

[Retardant]:[Gel]

A: 10:90 (40 grams of LFR and 360 grams of KPA)

B: 50:50 (200 grams of LFR and 200 grams of KPA)

C: 90:10 (360 grams of LFR and 40 grams of KPA)

Samples were prepared in a 400 ml glass jar using a spatula to mix.

Observations

A: There was too much powdered gel in the mixture; overwhelming the liquid concentrate resulting in a nonhomogeneous mixture of semi-wet powder.

B: Still unable to effectively mix together. Formed large lumps. The gel powder absorbs the liquid concentrate until saturated.

C: Used milled KPA instead of un-milled. Was able to mix with spatula. Resulted in creation of a viscous paste.

Used density measurements to determine volume of agent required, samples were diluted at a ratio of 5.5:1 (water: mixed concentrate) by volume to form the fire-fighting liquid.

Preparation of the solution was accomplished using a laboratory mixer fitted with a 2-inch propeller, stirring at 2100 rpm for 5 minutes. The 10 minute viscosity was recorded.

TABLE 10

| Consistency of Dry-Powder SAP Concentrate:Liquid Fire-Retardant Concentrate Mixtures. | |
| --- | --- |
| Sample | Viscosity (cP) |
| A solution | Too thick, not uniform |
| B solution | Too thick, not uniform |
| C solution | 1243 spin #4 @ 60 rpm |

Concentrates A, B, and C (Example 3 above), were prepared for a second time to determine reproducibility. In this case, a smaller sample size was chosen to reduce the difficulty of mixing the concentrates together.

Observations

A Concentrate: This time the two concentrates were easily mixed and a homogenous blend was obtained.

The final product is a dry powder, reddish in color. If left in a jar, the sample hardens, creating lumps. These lumps could be easily broken and pulverized. A 10 ml graduated cylinder was tared and filled to the 10 ml mark, and re-weighed to calculate density. The powder was not compacted with excess pressure, but handled to ensure there were no gaps in the cylinder.

A Concentrate: Three hundred thirty grams of water and 22.8 grams of Concentrate A were then mixed together using a 2-inch propeller and baffle configuration. Mixing was continued for 5 minutes at 2,100 rpm.

A Solution: Product hydrated in <10 seconds. Viscosity was >10,000 cP when mixed using spindle #4 at 60 rpm. The product was a homogeneous mixture that is brownish-red in color, dry gel consistency.

B Concentrate: After mixing, a 50:50 blend of dry-powder KPA and the LFR consisted of semi-solid gel-lumps. When stored, the lumps expanded as hydration continued. Using a 10 ml graduated cylinder, the gel-lumps were compacted in order to eliminate air pockets. Weight was used to calculate specific gravity. Water was mixed with the concentrate at a 5.5:1 ratio.

B solution: Hydrated in <10 seconds, similar to A solution. The end product was a dry red gel with a viscosity>10,000 cP.

C Concentrate: Mixed 90% of a liquid fire-retardant concentrate with 10% of a dry-powder SAP concentrate. This at first resulted in a wet fluid, however after 5 minutes the product hydrated, eventually turning into a thick wet paste.

Water was mixed with Concentrate C at a ratio of 5.5:1 in the same manner as described previously.

C Solution: The viscosity was 850 cP and Solution C was a red liquid gel.

The results of this example demonstrate that a dry-power SAP (sodium or potassium polyacrylate) is capable of absorbing large volumes of water in the presence of a liquid, ionic long-term retardant.

Example 5. Blends of a Dry-Powder SAP Concentrate and a Dry-Powder Long-Term Fire-Retardant Concentrate and Their Solutions An 800-gram sample of a dry-powder long-term retardant was prepared with the composition illustrated in Table 11.

TABLE 11

| Representative Composition of Dry-Powder Long-term Fire Retardant. | |
| --- | --- |
| Raw Materials | % |
| DAP | 8 to 12 |
| MAP | 75 to 85 |
| Biopolymer | 3.0 to 5.0 |
| Other non-thickening additives | <6.0 |
| Total | 100 |

The dry-powder retardant was mixed with potassium polyacrylate (KPA) SAP at various ratios; [Retardant]:[Gel], 100-gram was made of each.

[A]: 10:90 (10 grams of long-term fire retardant and 90 grams of KPA)

[B]: 50:50 (50 grams of long-term fire retardant and 50 grams of KPA)

[C]: 90:10 (90 grams of long-term fire retardant and 10 grams of KPA)

The dry powder components were thoroughly blended to produce a homogenous long-term retardant: SAP blend.

The volume of a 400-gram sample was measured at standard temperature and pressure (1 atm). The specific gravity (S.G.) was obtained.

Sample A: 100 grams=100 ml, $\delta$=1.00 g/ml, $\delta_A$ 1.00 g/ml×60 ml=60 g.

Sample B: 100 g=130 ml, $\delta$=0.77 g/ml, $\delta_B$ 0.77 g/ml×60 ml=46.2 g.

Sample C: 100 g=166 ml, $\delta$=0.60 g/ml, $\delta_C$ 0.60 g/ml×60 ml=36 g.

Solutions of A, B, and C were prepared using the following blinds:

A solution: (60 grams of retardant/KPA Blend A+330 ml of $H_2O$)

B solution: (46.2 grams of retardant/KPA Blend B+330 ml of $H_2O$)

C solution: (36 grams of retardant/KPA Blend C+330 ml of $H_2O$)

The solutions were prepared on a laboratory mixer fitted with a 2-inch Cowles turbine blade mixing for 5 minutes at a rotational speed of 3,000 rpm.

TABLE 12

Viscosity of Solutions Prepared With
Dry Powder LTR:dry powder SAP Blends.

| | |
|---|---|
| A solution | >10,000 |
| B solution | >10,000 spin #4 @ 60 rpm |
| C solution | 1,650 cP |

Observations

A Concentrate: Dry powder, pink in color.

A Solution: The measured viscosity was reached in <10 seconds.

B Concentrate: Dry powder, darker than Concentrate A.

B Solution: The measured viscosity was reached in <10 seconds.

C Concentrate: Dry powder.

C solution: A liquid with a viscosity of 1,650 cP.

Solution D was prepared by blending 43.6-grams of a dry-powder ammonium phosphate type fire retardant with 4.36-grams of KPA and then dissolving the blend in 400-ml of tap water.

Solution E was prepared by blending 32-grams of a dry-powder ammonium phosphate type fire retardant with 16 grams of KPA and then dissolving the blend in 400-ml of tap water.

Solution F was prepared by blending 25.2-grams of a MAP/DAP type fire retardant with 22.68-grams of KPA and then dissolving the blend in 400-ml of tap water.

All samples were mixed with water using a 2-inch Cowles turbine blade and at a rotational speed of 3,000 rpm for 5-minutes. See Table 13. (It is worthwhile to note that all three Solutions (D, E, and F) were prepared as an approximate 10.6 solution, i.e., equivalent to the U.S. Forest Service requirement that long-term fire-retardant formulations are, at a minimum, equivalent in retardancy performance to a 10.6% solution of diammonium phosphate.)

TABLE 13

Composition and Viscosity of 10.7% Solutions Prepared from Dry-
Powder Retardant and Dry-Powder Potassium Polyacrylate Blends.

| Solution | % Retardant | % KPA | % Water | Viscosity (cP) Spin #4 @ 60 rpm |
|---|---|---|---|---|
| D | 9.73 | 0.97 | 89.28 | 867 |
| E | 7.14 | 3.57 | 89.28 | 5,787 |
| F | 5.62 | 5.06 | 89.28 | >10,000 |
| KPA only (equivalent to amount in D) | — | 0.97 | 99.03 | 3,797 |
| KPA only (equivalent to amount in E) | — | 3.57 | 96.43 | >10,000 |
| KPA only (equivalent to amount in F) | — | 5.06 | 94.94 | >10,000 |

These data imply that the incorporation of a long-term retardant with a SAP somewhat reduces the SAP's ability to absorb water. This reduction is indicated by the lower viscosity of the FR/SAP solutions when compared with the viscosity of virgin SAP solutions containing the same percentage of active SAP as the solutions prepared from the blended concentrates. The fact that the blended samples exhibited both long-term fire-retardant properties and increased water absorbance, however, would be expected to significantly improve fire-fighting performance, particularly when the solutions are used to prevent ignition and to protect personal property.

Samples D, E, and F were repeated using a long-term fire retardant that did not contain a biopolymer thickener. The solutions were prepared in a manner identical to the above. The composition and viscosity of the solutions are illustrated in Table 14.

TABLE 14

Composition and Viscosity of 10.7% Solutions Prepared
from a Blend of Unthickened Dry-Powder Retardant
and Dry-Powder KPA Concentrate Blends.

| Solution | % Retardant | % KPA | % Water | Viscosity (cP) |
|---|---|---|---|---|
| D2 | 9.73 | 0.97 | 89.28 | 200 |
| E2 | 7.14 | 3.57 | 89.28 | 3,165 |
| F2 | 5.62 | 5.06 | 89.28 | >10,000 |

When compared with the viscosities of Solutions D, E, and F, the viscosities in Table 14 imply that the presence of a biopolymer in the long-term fire retardant increases the viscosities obtained from the SAP component alone.

Example 6. Blends of Dry-Powder MAP/DAP and Dry-Powder KPA and Their Solutions Three concentrate blends were prepared by intermixing three dry-powder components. Blend 1 was prepared by intermixing 1.01% diammonium phosphate, 8.16% mono-ammonium phosphate, and 91.84% potassium polyacrylate. Blend 2 was prepared by intermixing 5.05% diammonium phosphate, 40.82% monoammonium phosphate, and 59.18% potassium polyacrylate. Blend 3 consisted of 9.81% diammonium phosphate, 73.47% monoammonium phosphate, and 26.53% potassium polyacrylate. The three dry-powder concentrates were them mixed with tap water to prepare 15.3% solutions using a 2-inch Cowles turbine blade rotating at 1500-rpm for 5-minutes. The solutions prepared with Blends 1 and 2 exhibited viscosities >10,000 cP, while the solution prepared with Blend 3 exhibited a viscosity of 100 cP.

Example 7. Blend of Fire-Retardant Salts or Formulations and Liquid SAP Concentrate and Their Solutions As described herein, concentrate blends can be prepared by intermixing ionic long-term fire-retardant salts or formulated concentrates with dry powder or formulated liquid super absorbent polymer (SAP) concentrates. The resultant concentrated blends can then be mixed with water to produce fire-fighting solutions that exhibit viscosity significantly higher than would be expected and phosphorus pentoxide sufficient to produce long-term fire-retardant performance.

Two concentrates were prepared by mixing monoammonium phosphate with a liquid SAP concentrate. (Table 2 illustrates the composition of a liquid SAP concentrate.)

TABLE 15

Composition and Characteristic of Liquid SAP and Monoammonium
Phosphate Blends and Their Solutions.

| Concentrate Mixtures | | | Dilutes | | | | | | | |
|---|---|---|---|---|---|---|---|---|---|---|
| Liquid | | | | | wt % | | | Brookfield | | pH and S.G. |
| SAP | MAP | Sample | Concentrate | Liquid | | | | Viscosity (cP) | | S.G. |
| % | % | ID | Blend | SAP | MAP | Water | 10-min | 24 hr | pH | (g/ml) |
| 99.00 | 1.00 | A | 1.00 | 0.99 | 0.010 | 99.00 | 1710 | 1970 | 5.83 | 0.997 |
| 1.00 | 99.00 | K | 70.00 | 0.70 | 69.30 | 30.00 | 1000-1500 | 1100 | 3.63 | 1.405 |

TABLE 16

Composition and Characteristic of Liquid SAP and
Diammonium Phosphate Blends and Their Solutions.

| Concentrate Mixtures | | | Dilutes | | | | | | | |
|---|---|---|---|---|---|---|---|---|---|---|
| Liquid | | | | | wt % | | | Brookfield | | pH and S.G. |
| SAP | DAP | Sample | Concentrate | Liquid | | | | Viscosity (cP) | | S.G. |
| % | % | ID | Blend | SAP | DAP | Water | 10-min | 24 hr | pH | (g/ml) |
| 99.00 | 1.00 | A2 | 1.00 | 0.99 | 0.01 | 99.00 | 1903 | 1987 | 5.93 | 0.995 |
| 50.00 | 50.00 | B2 | 5.00 | 2.50 | 2.50 | 95.00 | 122 | 137 | 7.11 | 0.991 |
| 10.00 | 90.00 | E2 | 40.00 | 4.00 | 36.00 | 60.00 | 332 | 400 | 7.72 | 1.192 |
| 1.00 | 99.00 | K2 | 70.00 | 0.70 | 69.30 | 30.00 | 440 | 400 | 7.32 | 1.414 |

TABLE 17

Composition and Characteristics of Liquid SAP and Mixed
Ammonium Phosphate* Concentrates and Their Solutions.

| Concentrate wt % | | | Dilutes | | | | | | | |
|---|---|---|---|---|---|---|---|---|---|---|
| Liquid | Ammonium | Sample | Concentrate | Liquid | Ammonium | | Brookfield | | | pH and S.G. |
| | | | | | | | wt % | Viscosity (cP) | | S.G. |
| SAP | phosphate | ID | Blend | SAP | phosphate | Water | 10-min | 24 hr | pH | (g/ml) |
| 99.00 | 1.00 | A4 | 1.00 | 0.99 | 0.01 | 99.00 | 1127 | 1140 | 5.89 | 0.994 |
| 50.00 | 50.00 | B4 | 5.00 | 2.50 | 2.50 | 95.00 | 133 | 149 | 6.21 | 0.988 |
| 10.00 | 90.00 | E4 | 40.00 | 4.00 | 36.00 | 60.00 | 110 | 195 | 5.82 | 1.180 |
| 1.00 | 99.00 | K4 | 70.00 | 0.70 | 69.30 | 30.00 | 100 | 100 | 5.93 | 1.415 |
| 1.00 | 99.00 | L4 | 80.00 | 0.80 | 79.20 | 20.00 | 550 | 525 | 6.04 | 1.516 |

*The ammonium phosphate mixture used in this experiment is a 50:50 weight blend of monoammonium phosphate and diammonium phosphate.

TABLE 18

The Composition and Characteristics of Liquid SAP and
Diammonium Sulfate Concentrates and their Solutions.

| Concentrate Mixtures | | | Dilutes | | | | | | | |
|---|---|---|---|---|---|---|---|---|---|---|
| Liquid | | | | | wt % | | | Brookfield | | pH and S.G. |
| SAP | DAS | Sample | Concentrate | Liquid | DAS/ | | | Viscosity (cP) | | S.G. |
| % | % | ID | Blend | SAP | DAP | Water | 10-min | 24 hr | pH | (g/ml) |
| 99.00 | 1.00 | A3 | 1.00 | 0.99 | 0.01 | 99.00 | 953 | 1100 | 5.40 | 0.990 |
| 1.00 | 99.00 | K3 | 70.00 | 0.70 | 69.30 | 30.00 | 800 | 800 | 4.77 | 1.544 |

TABLE 19

Blends of DAS/DAP and Liquid SAP Formulation and Their Solutions.

| Concentrate Blend | | | Dilutes | | | | | | | |
|---|---|---|---|---|---|---|---|---|---|---|
| | DAS/DAP | | | wt % | | | Brookfield | | pH and S.G. | |
| Liquid | (50% | Sample | Concentrate | Liquid | DAS/ | | Viscosity (cP) | | | S.G. |
| SAP | blend) | ID | Blend | SAP | DAP | water | 10-min | 24 hr | pH | (g/ml) |
| 99.00 | 1.00 | A6 | 1.00 | 0.99 | 0.01 | 99.00 | 1290 | 1337 | 5.81 | 0.994 |
| 50.00 | 50.00 | B6 | 5.00 | 2.50 | 2.50 | 95.00 | 113 | 118 | 6.66 | 0.988 |
| 10.00 | 90.00 | E6 | 40.00 | 4.00 | 36.00 | 60.00 | 75 | 115 | 7.22 | 1.180 |
| 1.00 | 99.00 | L6 | 80.00 | 0.80 | 79.20 | 20.00 | 500 | 470 | 6.57 | 1.484 |

TABLE 20

Representative Blends of DAS/MAP and Liquid SAP Formulation and Their Solutions.

| Concentrate Blend | | | Dilutes | | | | | | | |
|---|---|---|---|---|---|---|---|---|---|---|
| | DAS/MAP | | | wt % | | | Brookfield | | pH and S.G. | |
| Liquid | (50% | Sample | Concentrate | Liquid | DAS/ | | Viscosity (cP) | | | S.G. |
| SAP | blend) | ID | Blend | SAP | MAP | water | 10-min | 24 hr | pH | (g/ml) |
| 99.00 | 1.00 | A5 | 1.00 | 0.99 | 0.01 | 99.00 | 647 | 667 | 5.79 | 0.989 |
| 1.00 | 99.00 | L5 | 80.00 | 0.80 | 79.20 | 20.00 | 1000 | 1000 | 3.74 | 1.524 |

Observations for Tables 15-20

Table 15

A Solution: Homogeneous sample—white.

K Solution: Two layers, bottom layer (80% v/v) white solids, top layer is transparent liquid.

Additional diammonium phosphate and liquid SAP concentrate solutions were prepared in the same manner as those shown above. These concentrates and their solutions and characteristics are illustrated in Table 16.

Four concentrates were prepared by mixing diammonium phosphate with a liquid SAP concentrate. (Table 2 illustrates the composition of a liquid SAP formulation).

Table 16

A2 Solution: Homogenous solution.

B2 Solution: Solution appears to be a homogeneous viscous gel solution.

E2 Solution: Solution is homogeneous and viscous.

K2 Solution: Two layers, bottom layer (80% v/v) is white solids, top layer is a transparent liquid.

The increased water solubility of diammonium phosphate, in comparison to monoammonium phosphate is obvious, i.e., there are no DAP crystals in the solutions and the solutions, in general, are more homogenous that when monoammonium phosphate was used.

Blends can be prepared using a mixture of mono and diammonium phosphate and a liquid SAP solution. The use of such blends of the ammonium phosphates is advantageous because the water solubility of mixtures are considerably greater than either of the two individually. For example, the blends illustrated in Table 17 were prepared and dissolved in water to produce solutions with elevated viscosities.

Table 17

A4 Solution: Homogeneous solution.

B4 Solution: Consists of two layers, the bottom layer (10% v/v) is transparent, top layer is a gel.

E4 Solution: Consists of two layers, the bottom layer (15% v/v) is clear and transparent, the top layer is a gel solution.

K4 Solution: Consists of two layers, the bottom layer (48% v/v) is white solids, The top layer is a transparent liquid.

L4 Solution: Consists of two layers, the bottom layer (82% v/v) is white solids, the top layer is a transparent liquid.

The significantly increased water solubility of an equal weight or equal molar mixture of monoammonium and diammonium phosphate results in more homogenous, one phase mixtures with the liquid SAP and consequently, would be preferred over either of the two phosphates individually.

Additional diammonium sulfate and liquid SAP concentrate solutions were prepared in the same manner as those shown above. These concentrates and their solutions and characteristics are illustrated in Table 18.

Table 18

A3 Solution: Homogeneous solution

K3 Solution: Consists of two layers, the bottom layer (67% v/v) is white solids, the top layer is a transparent liquid.

Table 19

A6 Solution: Homogeneous.

B6 Solution: Consists of two layers, The bottom layer (10% v/v) is clear and transparent.

E6 Solution: Consists of two layers, the bottom layer (10% v/v) is a clear and transparent liquid, The top layer is a gel.

L6 Solution: Consists of two layers, the bottom layer (84% v/v) is white solids, the top layer is a transparent liquid.

Table 20

A5 Solution: Appears homogenous

L5 Solution: Consists of two layers, the bottom layer (84% v/v) is white solids, the top layer is a transparent liquid.

Example 8. Retardant Salts with Potassium Polyacrylate (KPA)

As described herein, retardant components can be combined with a super absorbent polymer (SAP) to produce a concentrated blend. This concentrated blend can then be diluted to produce a solution which contains a viscosity significantly greater than water.

The purpose of this experimentation is to combine retardant salts such as monoammonium phosphate, diammonium phosphate and diammonium sulfate with a dry powder or granule SAP; e.g., sodium or potassium polyacrylate or sodium polyacrylamide. The concentrated dry blend of the components was dissolved in water to form solutions with a viscosity greater than 100 cP.

The amount of retardant salt and dry SAP in the concentrate blend can be varied from 1 to 99% (wt/wt) of the retardant salt or the SAP salt.

A blend of the dry components was prepared and then added to water. The amount of each component of the solution is described in the appropriate Table.

Sample preparation: All samples in this study were prepared with a laboratory stirrer fitted with 2-inch Cowles blade rotating at 1200 to 2100 rpm for 5 minutes duration. Mixing speed was varied up to 2100 rpm when the solution viscosity demanded.

TABLE 21

| Blends Composed of MAP and KPA and Their Solutions. | | | | | | | | | | | |
| Dry | | | Dilutes | | | | | | | | |
| Concentrate Blend | | | | wt % | | | Brookfield | | 10 min pH and | |
| KPA | MAP | Sample | Concentrate | | | | Viscosity (cP) | | S.G. | |
| % | % | ID | Blend | KPA | MAP | Water | 10-min | 24 hr | pH | S.G. |
| 99.00 | 1.00 | I | 1.00 | 0.99 | 0.01 | 99.00 | 2900 | 2300 | 6.57 | 0.998 |
| 50.00 | 50.00 | B | 5.00 | 2.50 | 2.50 | 95.00 | 387 | 425 | 5.37 | 1.029 |
| 10.00 | 90.00 | H | 40.00 | 4.00 | 36.00 | 60.00 | 202 | 217 | 4.23 | 1.227 |
| 1.00 | 99.00 | L | 70.00 | 0.70 | 69.30 | 30.00 | 1000-1500 | 1500 | 4.20 | 1.407 |
| 1.00 | 99.00 | M | 60.00 | 0.60 | 59.40 | 40.00 | 300 | 350 | 4.10 | 1.399 |

TABLE 22

| Blends Composed of DAP and KPA and Their Solutions. | | | | | | | | | | | |
| Dry | | | Dilutes | | | | | | | | |
| Concentrate Blend | | | | wt % | | | Brookfield | | 10 min pH and | |
| KPA | DAP | Sample | Concentrate | | | | Viscosity (cP) | | S.G. | |
| % | % | ID | Blend | KPA | DAP | Water | 10-min | 24 hr | pH | S.G. |
| 99.00 | 1.00 | B1 | 1.00 | 0.99 | 0.01 | 99.00 | 2350 | 1650 | 6.5 | 0.997 |
| 50.00 | 50.00 | A1 | 5.00 | 2.50 | 2.50 | 95.00 | 900 | 650 | 6.78 | 1.025 |
| 10.00 | 90.00 | C1 | 40.00 | 4.00 | 36.00 | 60.00 | 1100 | 2850 | 7.59 | 1.185 |
| 1.00 | 99.00 | L1 | 70.00 | 0.70 | 69.30 | 30.00 | 415 | 400 | 7.28 | 1.407 |

TABLE 23

Blends Composed of DAS and KPA and Their Solutions.

| Dry | | | Dilutes | | | | | | | |
|---|---|---|---|---|---|---|---|---|---|---|
| Concentrate Blend | | | | wt % | | | Brookfield Viscosity (cP) | | 10 min pH and S.G. | |
| KPA | DAS | Sample | Concentrate | | | | | | | |
| % | % | ID | Blend | KPA | DAS | Water | 10-min | 24 hr | pH | S.G. |
| 99.00 | 1.00 | B2 | 1.00 | 0.99 | 0.01 | 99.00 | 1700 | 1350 | 6.54 | 0.997 |
| 50.00 | 50.00 | A2 | 5.00 | 2.50 | 2.50 | 95.00 | 280 | 197 | 5.40 | 1.030 |
| 1.00 | 99.00 | O2 | 80.00 | 0.80 | 79.2 | 20.00 | 2550 | 2500 | 4.87 | 1.483 |

TABLE 24

Blends Composed of MAP/DAP and KPA and Their Solutions.

| Dry | | | Dilutes | | | | | | | |
|---|---|---|---|---|---|---|---|---|---|---|
| Concentrate Blend | | | | | | | Brookfield viscosity (cP) | | | Specific |
| wt % | wt % | Sample | | wt % | | | | | | |
| KPA | MAP/DAP* | ID | Solution | KPA | MAP/DAP | water | 10 minutes | 24 hours | pH | Gravity |
| 99.00 | 1.00 | B3 | 1.00 | 0.99 | 0.01 | 99.00 | 1,300 | 950 | 6.43 | 1.007 |
| 50.00 | 50.00 | A3 | 5.00 | 2.50 | 2.50 | 95.00 | 1,150 | 830 | 6.14 | 1.025 |
| 10.00 | 90.00 | C3 | 40.00 | 4.00 | 36.00 | 60.00 | 2,050 | 3,450 | 5.72 | 1.195 |
| 1.00 | 99.00 | O3 | 80.00 | 0.80 | 79.20 | 20.00 | 600 | 600 | 5.86 | 1.498 |
| 99.00 | 1.00 | B3 repeat | 1.00 | 0.99 | 0.01 | 99.00 | 1,400 | 1,100 | 6.43 | 1.004 |
| 50.00 | 50.00 | A3 repeat | 5.00 | 2.50 | 2.50 | 95.00 | 1,250 | 750 | 6.15 | 1.029 |
| 10.00 | 90.00 | C3 repeat | 40.00 | 4.00 | 36.00 | 60.00 | 3,800 | 3,000 | 5.76 | 1.178 |

*Consists of 50% MAP and 50% DAP

TABLE 25

Representative Blends of MAP/DAS and KPA and Their Solutions.

| Dry | | | Dilutes | | | | | | | |
|---|---|---|---|---|---|---|---|---|---|---|
| Concentrate Blend | | | | wt % | | | Brookfield Viscosity (cP) | | 10 min pH and S.G. | |
| KPA | MAP/DAS | Sample | Concentrate | | | | | | | |
| % | %* | ID | Blend | KPA | MAP/DAS | Water | 10-min | 24 hr | pH | S.G. |
| 99.00 | 1.00 | B4 | 1.00 | 0.99 | 0.01 | 99.00 | 1150 | 1100 | 6.46 | 1.006 |
| 50.00 | 50.00 | A4 | 5.00 | 2.50 | 2.50 | 95.00 | 450 | 350 | 5.42 | 1.029 |
| 1.00 | 99.00 | O4 | 80.00 | 0.80 | 79.20 | 20.00 | 1050 | 1000 | 4.22 | 1.531 |

*MAP and DAS are mixed together at 50% of each.

TABLE 26

Representative Blends of DAP/DAS and KPA and Their Solutions.

| Dry | | | Dilutes | | | | | | | |
|---|---|---|---|---|---|---|---|---|---|---|
| Concentrate Blend | | | | wt % | | | Brookfield Viscosity (cP) | | 10 min pH and S.G. | |
| KPA | DAP/DAS | Sample | Concentrate | | | | | | | |
| % | %* | ID | Blend | KPA | DAP/DAS | Water | 10-min | 24 hr | pH | S.G. |
| 99.00 | 1.00 | B5 | 1.00 | 0.99 | 0.01 | 99.00 | 2100 | 2000 | 6.49 | 1.000 |
| 50.00 | 50.00 | A5 | 5.00 | 2.50 | 2.50 | 95.00 | 750 | 550 | 6.44 | 1.030 |
| 10.00 | 90.00 | C5 | 40.00 | 4.00 | 36.00 | 60.00 | 5350 | 5450 | 5.55 | 1.140 |
| 1.00 | 99.00 | O5 | 80.00 | 0.80 | 79.20 | 20.00 | 550 | 500 | 6.51 | 1.483 |

*DAP and DAS are mixed together at 50% of each.

Observations for Tables 21-26

Table 21

I and B Solutions: Homogeneous and viscous.

H Solution: Consists of two layers, the bottom layer (70% v/v) is white solids, the top layer is a transparent liquid.

L Solution: Consists of two layers, the bottom layer (77% v/v) is white solids, the top layer is a transparent liquid.

M Solution: Consists of two layers, the bottom layer (62% v/v) is white solids, the top layer is a transparent liquid.

Table 22

B1, A1, C1 Solutions: Homogeneous and viscous.

L1 Solution: Consists of two layers, the bottom layer (74% v/v) is white solids, the top layer is a transparent liquid.

Table 23

B2 and A2 Solutions: Homogenous and viscous.

O2 Solution: Consists of two layers, the bottom layer (86% v/v) is white solids, the top layer is a transparent liquid.

Table 24

B3, A3, C3 Solutions: Homogenous and viscous.

O3 Solution: Consists of two layers, the bottom layer (86% v/v) is white solids, the top layer is a transparent liquid.

B3, A3, and C3 solutions were prepared a second time to demonstrate the ability to repeat the preparation of a solution with the same properties as those obtained during the first time it was prepared.

Table 25

B4 and A4 Solutions: Homogenous and viscous.

O4 Solution: consists of two layers, the bottom layer (83% v/v) is white solids, the top layer is a transparent liquid.

Table 26

B5, A5, C5 Solutions: Homogenous and viscous.

O5 Solution: Consists of two layers, the bottom layer (86% v/v) is white solids, the top layer is a transparent liquid.

Example 9: Fire-Retardant Solutions Having Constant Fire-Retardant Concentration In this example, a series of concentrates were prepared using varying ratios of SAP and fire-retardant and then diluted to produce solutions having a constant amount of fire retardant. In a first experiment, the SAP was AquaGel K (AGK) and the fire retardant was monoammonium phosphate (MAP) powder. In the second experiment, the SAP was Insul-8 and the fire-retardant was 11-37-0 (ammonium polyphosphate liquid concentrate). Fire retardant concentration was measured in the final solutions based on the concentration of the fire-retardant (e.g., MAP or 11-37-0) and the concentration of P205 (phosphorous pentoxide) in the solution.

The SAP and Fire retardant were combined to form a concentrate mixture before diluting with additional water to form a series of fire-retardant solutions (A-E and F-I), each having a constant amount of the fire-retardant component (e.g., 8.81 wt. % of MAP in A-E or 21.62 wt. % of 11-37-0 in F-I). Tables 27 and 28 describe the Brookfield viscosity (cP), specific gravity (g·ml) and degree of homogeneity measured or noted for each solution.

Sample preparation: All samples in this study were prepared with a laboratory stirrer fitted with 2-inch Cowles blade rotating at 1200 to 2100 rpm for 5 minutes duration. Mixing speed was varied up to 2100 rpm when the solution viscosity demanded.

TABLE 27

| | | | | | | | | | | | | | | |
|---|---|---|---|---|---|---|---|---|---|---|---|---|---|---|
| | | | | | | Dilutes | | | | | | | | |
| Concentrate Mixture | | | | Mix ratio (lbs concentrate mixture per gallon of water) | | wt % | | | | Brookfield Viscosity (cP) | | | | Homo-geneity |
| AGK (SAP):MAP ratio | AGK (wt %) | MAP (wt %) | Sample ID | | Concen-tration | AGK | MAP | % P2O5 | water | 10-min | 24 hr | pH | S.G (g/ml) | (Yes or No) |
| (2:1) | 67.67 | 33.33 | A | 3.00 | 26.43 | 17.62 | 8.81 | 5.33 | 73.57 | >10K | >10K | 5.06 | 0.926 | yes |
| (1:1) | 50.00 | 50.00 | B | 1.75 | 17.62 | 8.81 | 8.81 | 5.33 | 82.38 | >10K | >10K | 4.94 | 0.941 | yes |
| (1:2) | 33.33 | 66.67 | C | 1.25 | 13.22 | 4.41 | 8.81 | 5.33 | 86.78 | 5,700 | 4,300 | 4.97 | 1.046 | yes |
| (1:3) | 25.00 | 75.00 | D | 1.08 | 11.75 | 2.94 | 8.81 | 5.33 | 88.25 | 98 | 200 | 4.79 | 1.065 | yes |
| (1:4) | 20.00 | 80.00 | E | 1.00 | 11.01 | 2.20 | 8.81 | 5.33 | 88.99 | 25 | 35 | 4.76 | 1.061 | yes |

TABLE 28

| | | | | | Dilutes | | | | | | | | | |
| Concentrate Mixture | | | | Mix ratio by vol (water: | wt % | | | | | Brookfield Viscosity (cP) | | | | Homo-geneity |
| Insul-8 (SAP):11-37-0 ratio | Insul-8 (wt %) | 11-37-0 (wt %) | Sample ID | concentrate mixture) | Concentration | Insul-8 | 11-37-0 | % P$_2$O$_5$ | water | 10-min | 24 hr | pH | S.G (g/ml) | (Yes or No) |
|---|---|---|---|---|---|---|---|---|---|---|---|---|---|---|
| (1:1) | 50.00 | 50.00 | F | 1.54:1 | 43.24 | 21.62 | 21.62 | 8.00 | 56.76 | >10K | >10k | 5.45 | 1.037 | yes |
| (1:2) | 33.33 | 66.67 | G | 2.62:1 | 32.43 | 10.81 | 21.62 | 8.00 | 67.57 | >10K | >10k | 5.85 | 1.044 | yes |
| (1:3) | 24.98 | 75.02 | H | 3.21:1 | 28.82 | 7.20 | 21.62 | 8.00 | 71.18 | 3650 | 6000 | 6.02 | 1.079 | yes |
| (1:4) | 19.99 | 80.01 | I | 3.58:1 | 27.02 | 5.40 | 21.62 | 8.00 | 72.98 | 600 | 1,150 | 6.07 | 1.083 | yes |

The breadth and scope of the present disclosure should not be limited by any of the above-described exemplary aspects and embodiments, but should be defined only in accordance with the following claims and their equivalents.

What is claimed is:

1. A fire-fighting concentrate composition, the fire-fighting concentrate composition comprising a homogeneous mixture of a super absorbent polymer (SAP) concentrate and a long-term fire-retardant concentrate, wherein:

the SAP concentrate is a non-aqueous liquid comprising less than about 4% free water and the long-term fire-retardant concentrate is an aqueous liquid concentrate that contains less than about 1% free water, and the composition comprises about 40 to 60 parts by volume or weight SAP concentrate and about 60 to 40 parts by volume or weight long-term fire-retardant concentrate, and wherein:

the free water content of the composition is less than about 5%;

the composition further comprises a thickener, and optionally a corrosion inhibitor, a coloring agent, a flow conditioner, or a combination thereof; and the long-term fire-retardant concentrate comprises an ammonium phosphate fire retardant and/or an ammonium sulfate fire retardant.

2. The composition of claim 1, wherein the SAP concentrate is a non-aqueous liquid comprising less than about 3% free water.

3. The composition of claim 1, wherein the long-term fire-retardant concentrate is an aqueous liquid concentrate that contains no free water.

4. The composition of claim 1, wherein the SAP concentrate is a non-aqueous liquid comprising less than about 2% free water.

5. The composition of claim 1 wherein the SAP concentrate comprises a potassium and/or sodium polyacrylate, a polyacrylamide, a mineral oil, a vegetable oil or combinations thereof.

6. The composition of claim 1, wherein the long-term fire-retardant concentrate comprises an ammonium phosphate fire retardant.

7. The composition of claim 6, wherein the ammonium phosphate fire retardant comprises monoammonium phosphate and/or diammonium phosphate.

8. The composition of claim 1 wherein the long-term fire-retardant concentrate comprises an ammonium sulfate fire retardant selected from monoammonium sulfate and/or diammonium sulfate.

9. The composition of claim 1, wherein the composition further comprises a corrosion inhibitor, and a coloring agent.

10. The composition of claim 1, wherein the thickener comprises a biopolymer or an attapulgite clay.

11. The composition of claim 10 wherein the biopolymer comprises xanthan, welan, and/or rhamsan.

12. A method of preparing a fire-fighting concentrate, the method comprising mixing a SAP concentrate and a long-term fire-retardant concentrate, wherein:

the fire-fighting concentrate composition comprising a homogeneous mixture of a super absorbent polymer (SAP) concentrate and a long-term fire-retardant concentrate, wherein, the SAP concentrate is a non-aqueous liquid comprising less than about 4% free water and the long-term fire-retardant concentrate is an aqueous liquid concentrate that contains less than about 1% free water, and the composition comprises about 40 to 60 parts by volume or weight SAP concentrate and about 60 to 40 parts by volume or weight long-term fire-retardant concentrate, and wherein:

the free water content of the composition is less than about 5%;

the composition further comprises a thickener, and optionally a corrosion inhibitor, a coloring agent, a flow conditioner, or a combination thereof; and the long-term fire-retardant concentrate comprises an ammonium phosphate fire retardant and/or an ammonium sulfate fire retardant.

*    *    *    *    *